F. McCARTHY.
Cotton Gin.
No. 67,327.
Patented July 30, 1867.
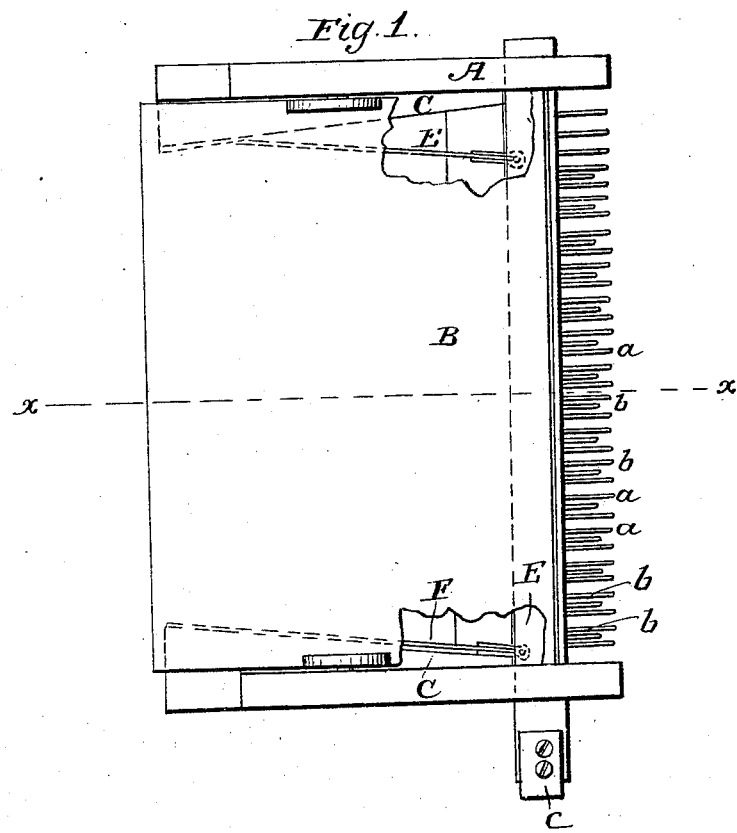
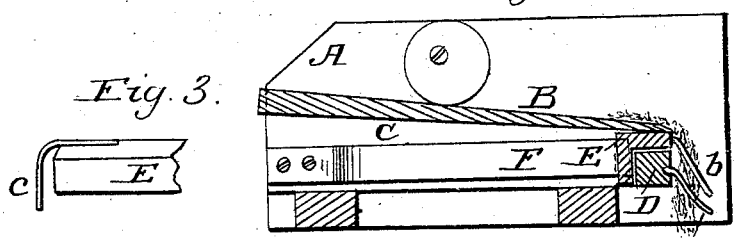
Witnesses:
Theo Tusche
J. A. Service
Inventor:
F. McCarthy
per Munn & Co
attorneys

United States Patent Office.

FONES McCARTHY, OF ORANGE SPRINGS, FLORIDA.

*Letters Patent No. 67,327, dated July 30, 1867.*

IMPROVEMENT IN COTTON-GINS.

*The Schedule referred to in these Letters Patent and making part of the same.*

TO ALL WHOM IT MAY CONCERN:

Be it known that I, FONES McCARTHY, of Orange Springs, in the county of Putnam, and State of Florida, have invented a new and useful Improvement in Cotton-Gins, and that the following description, taken in connection with the accompanying drawings, hereinafter referred to forms a full and exact specification of the same, wherein I have set forth the nature and principles of my said improvement, by which my invention may be distinguished from all others of a similar class, together with such parts as I claim and desire to have secured to me by Letters Patent.

This invention relates to a new and improved gin for ginning Sea-Island and other long-staple cotton, and is an improvement on what is known as the "McCarthy Gin," patented by me in 1840, and extended in 1854. The defect in this gin, and which I now attempt to remedy, is this: The cotton is fed to the drawing-cylinder on a plane horizontal grate, and is drawn in and held by the cylinder and breast-plate while the stripper, so called, a rapidly vibrating plate, strikes it (the cotton) and takes out the seed. This stripper, which makes from six to eight hundred strokes per minute, strikes the seed with such force that a great portion of them are driven above and fall upon the unginned cotton, and, mingling with it, greatly retard the ginning operation, making it necessary for the attendant to be constantly shaking and opening the cotton to get the seed out of the way. By this present improvement the cotton is presented to the cylinder vertically, or nearly so, down through a space between the feed-board and a vibrating-grate and the drawing-cylinder, the seed being prevented from rising by the cotton above them. In the accompanying sheet of drawings—

Figure 1 is a plan or top view of my invention.

Figure 2, a vertical section of the same.

Figure 3, a detached perspective view of a portion of the vibrating-bar.

Similar letters of reference indicate like parts.

A represents a feed-box, in which the feed-board B is placed slightly inclined, as shown in fig. 2, and resting on strips C C, which are attached to the inner surfaces of the sides of the box. D is a bar placed transversely in the front part of the feed-box, and having teeth $a$ attached to it and inclined downward. These teeth may be constructed of wire placed at suitable distances apart; and over this bar D there is placed a bar, E, said bar E being grooved longitudinally, so that the bar D may fit within it, as will be fully understood by referring to fig. 2. The bar D is fixed or immovable; but the bar E is a vibrating one, being attached near its ends to two springs F F, which admit of a longitudinal movement of the bar. This bar E, like the bar D, has a series of teeth, $b$, attached, which extend down directly over the teeth $a$, as shown clearly in fig. 2. The bar E may be vibrated by two cams attached to the pulley, which drives the drawing-cylinder of the gin; and, in order to avoid noise, and to secure an easy working of the bar E, a spring-piece, $c$, is attached to one end of it, said spring-piece serving as a check to the momentum of the bar, and yielding to the action of the cams sufficiently to effect that result. The vibrating toothed bar simply facilitates the descent of the cotton to the drawing-cylinder, and is not designed to take the seed from the cotton. It performs an important function, for without it the cotton could not be fed down regularly through a small space, say one and a half inch by two and a half inches deep. The grate formed by these teeth is comparatively short, and admits of being placed farther apart, or the teeth made of smaller wire, than the original horizontal grate, without allowing the cotton to pass through. The seed, therefore, are allowed to drop readily as soon as they are stripped from the cotton, and cannot be thrown upward through the space upon the cotton. With this improvement gins of the kind specified will do fifty per cent. more work on an average than they now do.

Having thus described my invention, I claim as new, and desire to secure by Letters Patent—

1. The feeding of the cotton to the drawing-cylinder of the gin in a vertical direction, substantially in the manner as and for the purpose set forth.

2. The fixed or stationary toothed bar D, in combination with the reciprocating or vibrating toothed bar E, when arranged or placed so that their teeth will be in a space between the feed-box and the drawing-cylinder, down through which the cotton is fed to the drawing-cylinder, substantially as shown and described.

FONES McCARTHY.

Witnesses:
H. W. WATERBURY,
JOHN LIVINGSTON.